United States Patent [19]

Foley et al.

[11] Patent Number: 5,559,987

[45] Date of Patent: Sep. 24, 1996

[54] METHOD AND APPARATUS FOR UPDATING A DUPLICATE TAG STATUS IN A SNOOP BUS PROTOCOL BASED COMPUTER SYSTEM

[75] Inventors: Denis Foley, Shrewsbury; Maurice B. Steinman, Hudson; Stephen R. VanDoren, Shrewsbury, all of Mass.

[73] Assignee: Digital Equipment Corporation, Maynard, Mass.

[21] Appl. No.: 268,409

[22] Filed: Jun. 30, 1994

[51] Int. Cl.$^6$ .................................................. G06F 12/08
[52] U.S. Cl. .................... 395/471; 395/467; 395/496; 395/473; 395/403
[58] Field of Search ................ 364/700 MS, 900 MS; 395/425, 471, 467, 496, 403, 468, 469, 470, 472, 473

[56] References Cited

U.S. PATENT DOCUMENTS

| | | | |
|---|---|---|---|
| 4,622,631 | 11/1986 | Frank et al. | 395/800 |
| 5,148,533 | 9/1992 | Joyce et al. | 395/425 |
| 5,226,130 | 7/1993 | Favor et al. | 395/375 |
| 5,226,148 | 7/1993 | Milia et al. | 395/425 |
| 5,319,766 | 6/1994 | Thaller et al. | 395/425 |

*Primary Examiner*—Matthew M. Kim
*Attorney, Agent, or Firm*—Mark J. Casey; Denis G. Maloney; Arthur W. Fisher

[57] ABSTRACT

A method and apparatus in a computer system for updating Duplicate Tag cache status information. The invention operates in a computer system having one or more processor modules coupled to a system bus operating in accordance with a SNOOPING bus protocol. Processor commands and addresses for modification of an entry of the processor's Duplicate Tag status information is provided by the processor to its address interface to the system bus. System bus command and address information is received and stored in a interface pipeline of the address interface. A determination is made as to whether the system bus commands and addresses in the interface pipeline are valid. If there are no valid system bus commands and addresses in the interface pipeline, the Duplicate Tag status information is updated without determining if the processor commands and addresses conflict with the system bus commands and addresses.

6 Claims, 4 Drawing Sheets

METHOD AND APPARATUS FOR UPDATING A DUPLICATE TAG STATUS IN A SNOOP BUS PROTOCOL BASED COMPUTER SYSTEM

FIELD OF THE INVENTION

This invention relates to the field of computer systems and, more particularly, to a computer system with an enhanced cache memory processing operation.

BACKGROUND

Modern computer systems utilize various technologies and architectural features to achieve high performance operation. Innovative arrangements of system components can often result in significant improvements in the capabilities and processing power of the computer system.

Such high performance capabilities can be achieved in computer systems which employ several computer central processing units (i.e., CPUs or processors) arranged on modules in a multiprocessor system configuration. In addition to CPU modules, such a multiprocessor system can further include several I/O modules and memory modules, all coupled to one another by a system bus. The CPUs can be utilized to perform co-operative or parallel processing as well as multi-tasking among them for execution of several applications running simultaneously, to thereby achieve dramatically improved processing power. The capabilities of the overall system can be also enhanced by providing a cache memory at each one of the CPUs in the computer system.

A cache memory comprises a relatively small, yet relatively fast memory device arranged in close physical proximity to a processor. The utilization of cache memories is based upon the principle of locality. It has been found, for example, that when a processor accesses a location in memory, there is a high probability that the processor will continue to access memory locations surrounding the accessed location for at least a certain period of time. Thus, a preselected data block of a large, relatively slow access time memory, such as a main memory module coupled to the processor via a system bus, is fetched from main memory and stored in the relatively fast access cache memory. Accordingly, as long as the processor continues to access data from the cache memory, the overall speed of operation of the processor is maintained at a level significantly higher than would be possible if the processor had to arbitrate for control of the system bus and then perform a memory READ or WRITE operation, with the main memory module, for each data access.

The capabilities of the multiprocessor computer system can be further enhanced by sharing main memory among the CPUs and by operating the system bus in accordance with a SNOOPING bus protocol.

In shared memory multiprocessor systems, it is necessary that the system store a single, correct copy of data being processed by the various processors of the system. Thus, when a processor WRITES to a particular data item stored in its cache, that copy of the data item becomes the latest correct value for the data item. The corresponding data item stored in main memory, as well as copies of the data item stored in other caches in the system, becomes outdated or invalid.

In a write back cache scheme, where processor WRITEs are performed into a processor's cache, the data item in main memory is not updated until the processor requires the corresponding cache location to store another data item. Accordingly, the cached data item that has been modified by the processor WRITE remains the latest copy of the data item until the main memory is updated. It is, therefore, necessary to implement a scheme to monitor READ and WRITE transactions to make certain that the latest copy of a particular data item is properly identified whenever it is required for use by a processor.

The well known SNOOPING bus protocol provides such a scheme and, the necessary coherency between the various cache memories and the main memory of the computer system. In accordance with the SNOOPING bus protocol a system bus interface of each processor, or other component in the multiprocessor computer system, monitors the high performance system bus for bus activity involving addresses of data items that are currently stored in the processor's cache. Status bits are maintained in Tag stores associated with each cache to indicate the status of each data item currently stored in the cache.

One possible status bit associated with a particular data item is a VALID bit. The VALID bit identifies if the cache entry has a copy of a valid data item in it, i.e., the stored data item is coherent with the latest version of the data item, as may have been written by one of the processors of the computer system.

Another possible status bit associated with a particular data item is a SHARED bit. The SHARED bit identifies if more than one cache in the system contains a copy of the data item. A cache element will transition into this state if a different processor caches the same data item. That is, if when SNOOPING on the system bus, a first interface determines that another cache on the bus is allocating a location for a data item that is already stored in the cache associated with the first interface, the first interface notifies the other interface by asserting a SHARED signal on the system bus, signaling the second interface to allocate the location in the shared state. When this occurs the first interface will also update the state of its copy of the data item to indicate that it is now in the shared state.

Another possible status bit associated with a particular data item stored in a cache memory can be what is generally called a DIRTY bit. A cache entry is dirty if the data item held in that entry has been updated more recently than main memory. Thus, when a processor WRITES to a location in its cache, it sets the DIRTY bit to indicate that it is now the latest copy of the data item.

Also, in such a multiprocessor computer systems, for every command/address that some other processor module sends across the system bus, the present processor module would have to look up that address in its primary cache, find out if its in there and determine what action to take in response to the command/address.

To minimize this additional cache lookup activity, one or more Duplicate Tag (DTAG) stores are provided for each processor module. This DTAG approach allows for an identical copy of the primary cache memory Tag information. The Tag information in the primary cache is for use in conjunction with its processor. The Tag information in the DTAG cache is for use in conjunction with the system bus.

Therefore, as system bus commands come along the system bus, the present processor module would look up the command/address in its DTAG to find out if the address is there and determine what action to take in response to the command/address coming along the system bus.

Since there is a primary cache Tag store and a DTAG store, it is the goal of the system that each concurrently contain the same information. However, because of time delays in the system processes there may be a time delay between an update of the Status bit in the DTAG cache and the update of the Status bit in the primary cache. Therefore, the overall system protocol uses the DTAG cache lookup to determine the actual state of a cache entry. As such, the DTAG status becomes the overall system's "Point of Coherency".

In the above described system a processor can issue a WRITE command to SHARED blocks and to PRIVATE (non-SHARED) blocks. Such WRITEs are handled in varying manners depending on the nature of the Status bits.

For example, a block that is not VALID (or that misses in the cache) cannot be written. It must be first read.

It is read via a READ_MISS_MOD command which will leave the block in the VALID, PRIVATE and DIRTY state if the block is not found to be SHARED, or in the VALID, SHARED state if the block is found to be SHARED.

WRITEs to VALID, SHARED blocks result in a WRITE_BLOCK command being issued to the system (updating memory, updating/invalidating other processors).

WRITEs to VALID, PRIVATE and DIRTY blocks result in WRITEs to the processor's cache, which do not update memory until the modified block is evicted or transitioned to VALID, SHARED, DIRTY and then written.

If a block is VALID, PRIVATE and CLEAN (non-DIRTY) it must be transitioned to the VALID, PRIVATE, DIRTY state or the VALID, SHARED state before it can be written.

When a processor encounters a STORE command to a VALID, PRIVATE, CLEAN block, the processor tries to transition the block to VALID, PRIVATE and DIRTY status by issuing a SET DIRTY command. The SET DIRTY command is issued to update a processor's DTAG (its Point of Coherency) to the new status before the processor's local cache status is updated. This is required to maintain cache coherency. If a READ/WRITE command from another processor to the block being written (causing the SET DIRTY command) has updated a processor's DTAG to SHARED or INVALID before the SET DIRTY command can change the block to VALID, PRIVATE, DIRTY, but has not yet updated the processor's local Tag status, the system must discontinue processing of the SET DIRTY command and allow the processor's local Tag status to be updated according to the system bus command.

If there are no intervening READs or WRITEs to the block being SET DIRTY, the system will update the DTAG status to VALID, PRIVATE and DIRTY and acknowledge the processor's SET DIRTY command.

While the above described cached, multi-processor computer system with cache memories and SNOOPING bus protocol using VALID, SHARED and DIRTY status bits represents a state-of-the-art model for a high performance computer system, the art has yet to achieve an optimal level of performance efficiency.

For example, typical means for processing a SET DIRTY command consists of comparing the SET DIRTY address against all outstanding commands/addresses that have been issued to the DTAG and not issued to the processor's primary cache Tag. The comparison involved with this typical handling of a SET DIRTY command require numerous clock cycles, even with an idle system bus. The use of such numerous clock cycles is wasteful, thereby impeding the overall performance of the computer system.

Therefore, a need exists for a method and apparatus for enhancing coherency regarding the setting of Duplicate Tag DIRTY status bits such that cache modification can occur in a minimal amount of cycles and thereby provide a significant gain in the overall performance of the computer system.

SUMMARY OF THE INVENTION

A method and apparatus in a computer system is provided for updating Duplicate Tag cache status information. The invention operates in a computer system having one or more processor modules coupled to a system bus operating in accordance with a SNOOPING bus protocol. The system bus is capable of transmitting system bus commands and addresses. Each of the processor modules includes a a processor which issues processor commands and addresses. The processor modules each further include an address interface coupled to the system bus. The address interface has an interface pipeline for receiving and storing system bus commands and addresses in an ordered sequence. Each of the processor modules also include a Duplicate Tag memory coupled to its address interface. The Duplicate Tag memory has storage for both Duplicate Tag addresses and Duplicate Tag status information. In accordance with the present invention, processor commands and addresses for modification of an entry of its Duplicate Tag status information are provided by the processor (commanding processor) to its address interface. System bus command and address information from the system bus is received and stored in the interface pipeline of the commanding processor. A determination is made as to whether the system bus commands and addresses received and stored in the interface pipeline are valid. If it is determined that there are no valid system bus commands and addresses in the interface pipeline, the Duplicate Tag status information is caused to be updated in accordance with the processor commands and addresses for modification without determining if the processor commands and addresses conflict with the system bus commands and addresses. Also, if the determination is made that there are valid system bus commands and addresses in said interface pipeline means, a further determination is made as to whether the processor commands and addresses for modification conflict with the system bus commands and addresses. If the further determination shows that the processor commands and addresses for modification do not conflict with the system bus commands and addresses, the Duplicate Tag status information is caused to be updated in accordance with the processor commands and addresses for modification.

DETAILED DESCRIPTION

Figure 1:
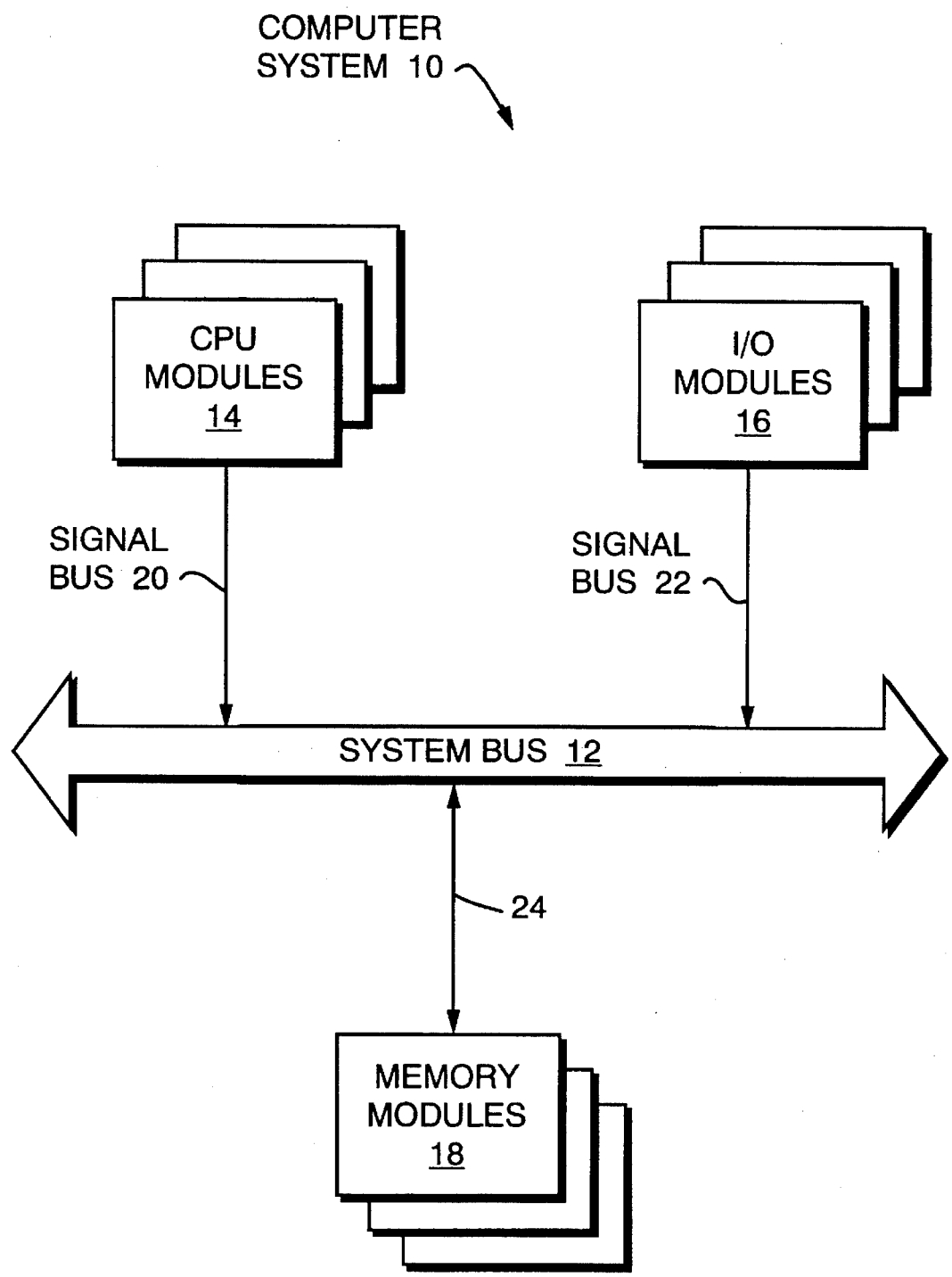
FIG. 1 shows an overview of the general computer system embodying the invention.

FIG. 1 shows a general computer system 10 having a System Bus 12 with a plurality of CPU modules 14, a plurality of I/O modules 16 and a plurality of memory modules 18. The CPU modules, the I/O modules and the memory modules all attach to System Bus 12 through signal lines 20, 22 and 24 respectively. Each of the signal lines 20, 22, 24 can comprise one or more wires depending on the signal transmission protocol used by the components of the system.

The system bus, CPU modules, memory modules and I/O modules perform standard computer system functions. The system bus provides a communication medium for the modules attached thereto. The CPU modules execute instructions and transfer data. The memory modules store instructions and data. The I/O modules provide input/output communication via the system bus to the CPUs and the memory modules.

Figure 2:
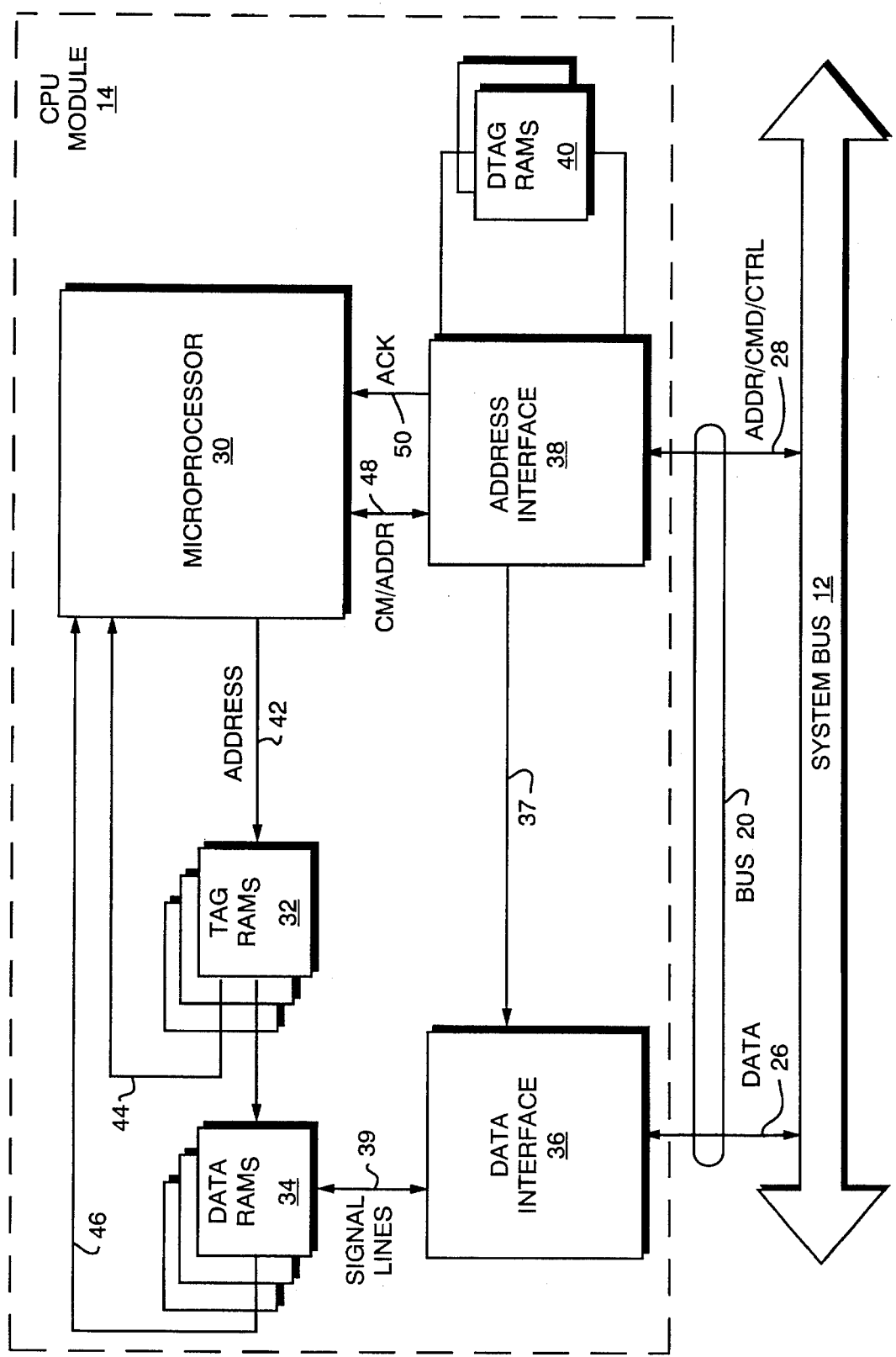
FIG. 2 illustrates one of the CPU Modules of the general computer system.

FIG. 2 shows one of the plurality of CPU modules 14. CPU module 14 connects to System Bus 12 through a plurality of signal lines 20, which include data lines 26 and address/command/control lines 28.

Included on CPU module 14 is Microprocessor 30, one or more Cache Tag RAMs 32, one or more Cache DATA RAMs 34, Data Interface 36, Address Interface 38 and one or more Duplicate Tag (DTAG) RAMs 40. CPU module 14 may contain other elements (not shown) which are used in the operation of the computer system, such as power supplies, clocks, etc. but are not pertinent to the understanding of the present invention.

In its operation, Microprocessor 30 may put out requests for data/instructions from memory. Before having to access Memory Modules 18, caching is invoked using Cache Tag RAMs 32 and Cache DATA RAMs 34. Namely, Microprocessor 30 will first look to see if the desired block of data is in its Cache DATA RAMs 34 before having to obtain the data from Memory Modules 18.

In putting out the memory request, Microprocessor 30 passes an Address over signal lines 42 to Cache Tag RAMs 32 and Cache DATA RAMs 34 simultaneously. Tag Data/ Status information is provided back to Microprocessor 30 over Tag DATA/Status lines 44. The Tag Data/Status information is used by Microprocessor 30 to determine if the desired block of data is present in the Cache DATA RAMs 34.

The Tag Data information contains both Address information and Status information of the block of data in the Cache DATA RAMs. The Address information portion shows which specific block out of all of memory is held in the particular cache entry. The Status information portion shows the status of that particular cache block. The Status information includes a VALID bit, a SHARED bit and a DIRTY bit as has been described above.

If the memory request, for example an instruction/command desiring a READ of data, is capable of being serviced by a cache entry, the Microprocessor request will then be satisfied by only needing the cache memory access i.e., there was a HIT in the cache. If there is a HIT, data is provided back to Microprocessor 30 over data lines 46.

If the Microprocessor request is not satisfied, i.e., there was a MISS in the cache, the Microprocessor needs to then access main memory. For example, if during the READ, the cache state is not VALID, or the addresses in the Tag RAMs do not match the address required by the Microprocessor, i.e., that block is not in the cache, Microprocessor 30 will issue a command through COMMAND/ADDRESS lines 48 to Address Interface 38. Address Interface 38 responds with an ACKNOWLEDGE (ACK) sent along ACK lines 50 and then issues a command over ADDRESS/COMMAND/ CONTROL signal lines 28 to the system bus 12 requesting data to be sent back from one of the Memory Modules 18.

Data is then returned across the System Bus 12 to the Data Interface 36 over Data Lines 26. Address Interface 38 is the controller for Data Interface 36. For any data movement associated with any command/address received by Address Interface 38, the Address Interface determines the type of data movement (e.g., data is to be received off the system bus) and sends control signals indicating such to Data Interface 36 over signal lines 37. Once the Data Interface receives the data, the Address Interface 38 then lets Microprocessor 30 know by signals over the COMMAND/ADDRESS lines 48 that the requested data has come back. The data is sequenced, sent out over data lines 39 and is written into both the Cache DATA RAMs 34 and also into Microprocessor 30 by way of data lines 46.

A related copending application entitled "METHOD AND APPARATUS FOR CACHE MEMORY VICTIM DATA HANDLING" filed by the Assignee of the present invention describes a technique involving the data in the Cache DATA RAMs which become "victimized" when there is a READ to one of the cache's addresses.

As shown in FIG. 1, there can be multiple CPU Modules in the computer system configuration. As such, if any other CPU Module 14, or even any I/O Module 16 on the System Bus 12, issues a command to some address, it can affect a cache block of another CPU Module. The status of that block must then be clearly established and the appropriate Tag Status bits set. Table 1 below shows what effect system bus actions have on the state of a given cache block.

TABLE 1

| System Bus Operation | Tag Probe Results | Next Cache State |
| --- | --- | --- |
| Read | Match OR Invalid | No Change |
| Write | Match OR Invalid | No change |
| Read | Match AND Dirty | Shared, Dirty |
| Read | Match AND Dirty | Shared, Dirty |
| Write | Match | Invalid |

In Table 1, the "System Bus Operation" column shows the command on System Bus 12. The "Tag Probe Results" column shows the result of a lookup of the address of the command on the system bus in Cache Tag RAMs 32 to see if the address is there (i.e., a Match) and determine information about the addressed block (e.g., its status). The "Next Cache State" column shows the status of the cache as a result of action taken based upon the System Bus Operation undertaken and Tag Probe Results.

In such a multiple CPU system, for every command/ address that some other commander module sends across the system bus, the present CPU Module would have to look up that address in its Cache Tag RAMs, find out if its in there and determine what action to take in response to the command/address.

To minimize this additional Cache Tag RAM lookup activity, one or more Duplicate Tag RAMs 40 (DTAGs) are provided. This DTAG approach allows for two identical copies of the Cache memory Tag information. The information in the Cache Tag RAMs 32 will be for use in conjunction with Microprocessor 30. The information in the DTAG RAMs 40 will be for use in conjunction with system bus 12.

Therefore, as system bus commands come along System Bus 12, the present CPU Module would look up the command/address in its DTAG to find out if the address is there and determine what action to take in response to the command coming along the system bus.

Figure 3:
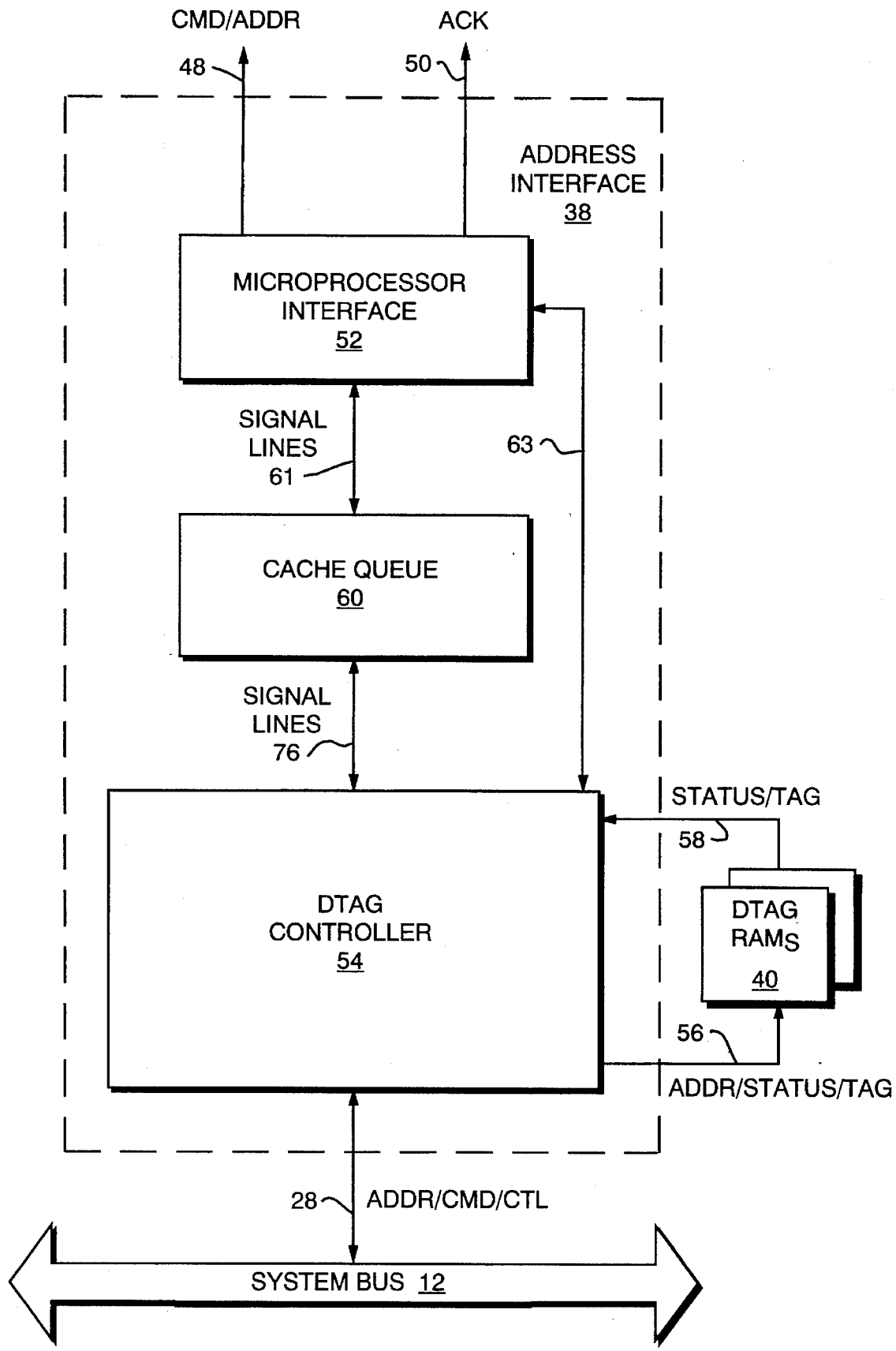
FIG. 3 shows in more detail the Address Interface of one of the CPU Modules.

Now referring to FIG. 3, Address Interface 38 on CPU Module 14 is shown in more detail as to its operation in the implementation of the present invention. Address Interface 38 includes Microprocessor Interface 52 which transmits and receives the COMMAND/ADDRESS and ACK signals over signal lines 48 and 50 respectively. Address Interface 38 also includes a DTAG Controller 54. DTAG Controller 54 transmits and receives COMMAND, ADDRESS and CONTROL signals over signal lines 28 from System Bus 12. DTAG RAMs 40 are coupled to DTAG Controller 54. Address/Status/Tag information is provided to DTAG RAMs 40 over signal lines 56 and Status/Tag information is provided back to DTAG Controller 54 over signal lines 58. Coupled between Microprocessor Interface 52 and DTAG Controller 54 is a Cache Queue 60. Cache Queue 60 includes a series of Cache Queue locations. Signal lines 63 also couple Microprocessor Interface 52 to DTAG Controller 54.

System bus 12 is a highly pipelined bus. Pipelined systems operate in an "assembly line" fashion. An operation, e.g., the processing of an instruction/command, is divided into a number of stages and different tasks related to the operation are allowed to be in different stages of completion at any one time. Cache Queue 60 assists in the handling of pipelined commands coming off System Bus 12. For example, commands/addresses can come from System Bus 12 for processing by a Microprocessor 30 faster than the microprocessor can process them. To maintain optimum system bus performance it is desirable that the system bus operation not be slowed down.

As commands/addresses from System Bus 12 arrive at DTAG Controller 54 over signal lines 28, the commands/addresses are filtered through DTAG RAMs 40, which operate to do a Tag lookup in place of having to access Cache Tag RAMs 32. Only those commands/addresses associated with the blocks of data in Cache Data RAMs 34 are passed from DTAG Controller 54 over lines 76 to Cache Queue 60. This creates an ordered list of filtered commands in Cache Queue 60, which are sent in order over lines 61a to Command Issuer 66 in Microprocessor Interface 52. Command Issuer 66, in turn, forwards the filtered commands to Microprocessor Interface Controller 64 where they are dispatched over Command/Address lines 48 to Microprocessor 30.

As an example of the functional operation of Cache Queue 60, consider a READ command coming to a CPU module 14 over System Bus 12 from another CPU module. If the DTAG Controller found that the address matched the Tag in the DTAG RAMs, which, in turn, meant that the address and corresponding data was also located in the Cache Tag/Data RAMs 32, 34, the Status bit associated with that block in the DTAG RAMs must be changed to SHARED, since the other CPU Module has now also read the block. A SET SHARED command would be then loaded by the DTAG Controller 54 into Cache Queue 60. The SET SHARED command would wait its turn in Cache Queue 60 to be issued to Microprocessor 30 by way of signal lines 61, Microprocessor Interface 52 and its respective COMMAND/ADDRESS signal lines 48. Microprocessor 30 would execute a SET SHARED operation on the primary cache Tag RAMs 32 and put its Status bit in the SHARED state.

In this example it can be seen that once the command is put into Cache Queue 60, as a result of the queuing process it may take some time to reach Cache Tag RAMs 32. Accordingly, there is a time delay between the update of the Status bit in the DTAG RAMs 40 and the update of the Status bit in the Tag RAMs 32. Therefore, the overall system protocol uses the DTAG RAM lookup as the actual, state of a cache entry. As such, the DTAG RAM status becomes the overall system's "Point of Coherency".

Consider the situation where the CPU Module wishes to do a WRITE. If the CPU Module has a block of data that has a VALID status in its corresponding Cache Tag RAMs and the CPU Module desires to WRITE that block, the CPU Module then needs to change the corresponding status bit to the DIRTY state. However, since the Point of Coherency is at the DTAG RAMs, if Microprocessor 30 in the CPU Module would change a primary cache Tag RAM status to DIRTY and wait for a command to get back to the corresponding DTAG RAM to change its status to DIRTY, some other CPU Module may send a command/address along System Bus 12, look up the address in DTAG RAMs 40 and find that the DTAG RAM status does not match the primary cache Tag RAM status. To help solve this problem the Microprocessor doing the WRITE, would issue a SET DIRTY command over the COMMAND/ADDRESS signal lines 48 to tell Address Interface 38 that a certain block specified by the address is to be set to the DIRTY state. Address Interface 38 would determine if the status in the DTAG RAMs can be changed to DIRTY in accordance with the cache coherency rules of the SNOOPY bus protocol, and if it can, the status would be changed in the DTAG RAMs to DIRTY. Address Interface 38 would then issue an ACK command on signal line 50 back to Microprocessor 30. Microprocessor 30 would then set the DIRTY bit in Cache Tag RAMs 32 and modify the actual data block in the Cache Data RAMs 34.

Figure 4:
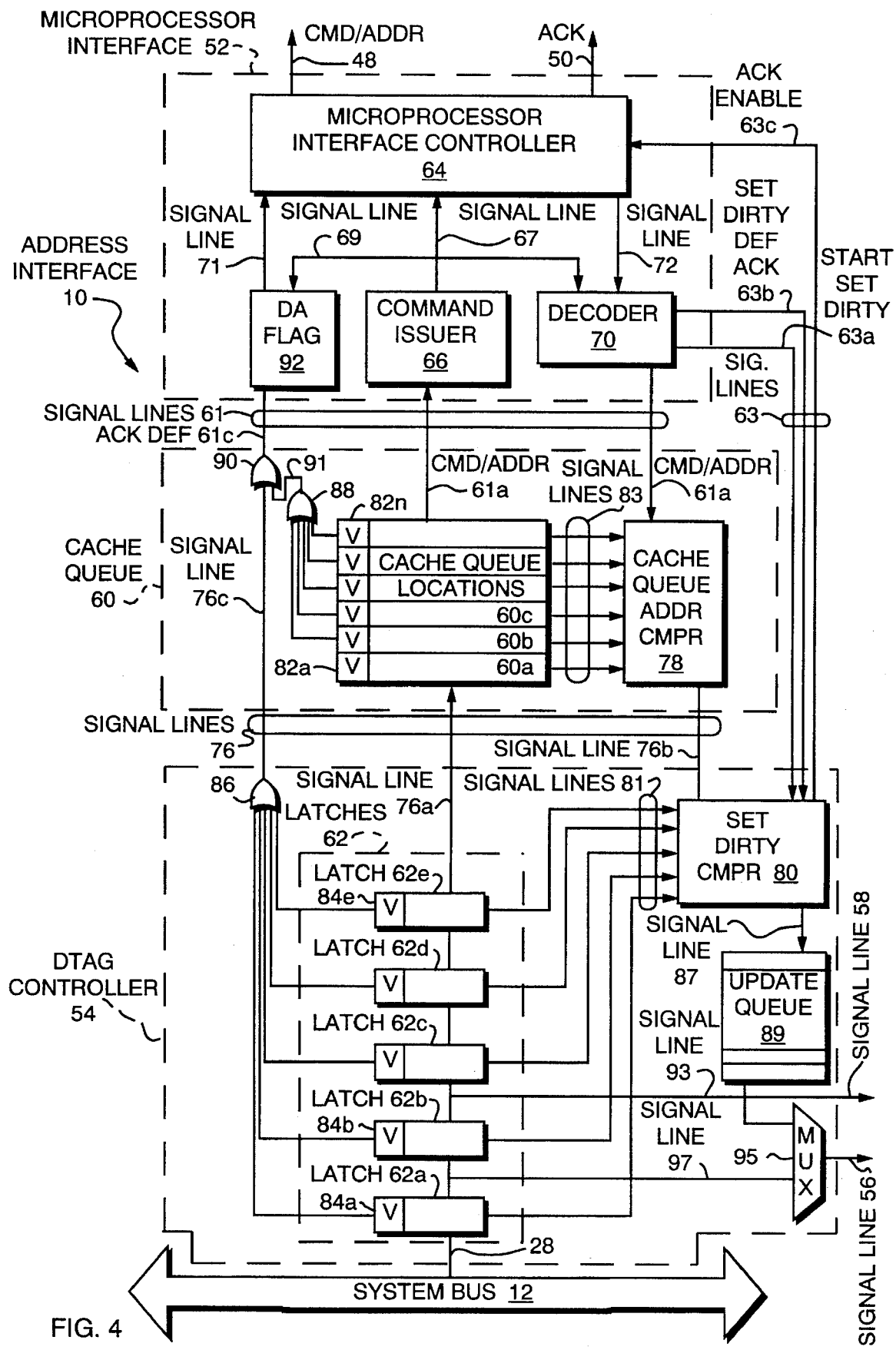
FIG. 4 shows in more detail certain command processing elements of the Address Interface of the CPU Module.

Now turning to FIG. 4, the SET DIRTY command processing in conjunction with Microprocessor Interface 52, Cache Queue 60 and DTAG Controller 54 is shown in more detail.

Microprocessor Interface 52 includes Microprocessor Interface Controller 64 which transmits and receives COMMAND/ADDRESS signals along signal lines 48 and provides all ACK along signal lines 50. Microprocessor Interface 52 also includes Command Issuer 66 which issues commands over signal lines 67 to Microprocessor 30 as received from the Cache Queue 60 along the signal lines 61a portion of signal lines 61. Microprocessor Interface 52 also includes Decoder 70 which receives commands coming from Microprocessor 30 along signal lines 72 and, in part, provides command/address information to Cache Queue 60 over the signal lines 61b portion of signal lines 61. Default Acknowledge (DA) Flag 92 is also part of Microprocessor Interface 52 and is coupled to Decoder 70 by signal lines 69 and to Microprocessor Interface Controller 64 by signal lines 71. The function of DA Flag 92 will be described hereinafter.

DTAG Controller 54 includes a latch pipeline 62 which receives Address information over signal lines 28 from System Bus 12. Address information is received by latch 62a and is piped through the latches (i.e., from latch 62a to latch 62b, then to latch 62c, then to latch 62d and then to latch 62e). Upon completion through the latch pipeline 62, the Address information is then provided to the Cache Queue 60 by the signal lines 76a portion of signal lines 76 if the Address information in latch pipeline 62 is found to match corresponding Address portion is DTAG RAMs 40 and the DTAG Status indicates VALID.

Coupled between Microprocessor Interface 52 and DTAG Controller 54 is Cache Queue 60. Cache Queue 60 has a series of Cache Queue locations 60a, 60b, . . . 60n. After commands pass through latch pipeline 62, they are sent to first Cache Queue location 60a over signal lines 76a. The commands similarly pass through the other Cache Queue locations and are sent in sequence over signal lines 61a to Command Issuer 66. In the preferred embodiment there are eight Cache Queue locations.

Each entry in the Cache Queue 60 has a VALID status bit (e.g., Cache Queue location 60a has a VALID bit 82a, Cache Queue location 60b has a VALID bit 82b, and so on). Each of the latches in latch pipeline 62 also has a VALID status bit (e.g., pipeline latch 62a has a VALID bit 84a, pipeline latch 62b has a VALID bit 84b, and so on). The inputs to OR Gate 86 are coupled to each of the pipeline latch VALID bits 84. The inputs to OR Gate 88 are coupled to each of the Cache Queue location VALID bits 82. The, outputs of OR Gate 86 and OR Gate 88 are input into OR Gate 90 by signal lines 76c and 91 respectively. The output of OR Gate 90 is coupled to Default Acknowledge Flag 92 by signal line 61c.

Both DTAG Controller 54 and Cache Queue 60 contain address comparator circuits. A Set Dirty Comparator 80 in DTAG Controller 54 is coupled in parallel to each latch of latch pipeline 62 by signal lines 81. A Cache Queue Address Comparator 78 is coupled in parallel to each of the Cache Queue locations 60n by signal lines 83.

During the operation of the computer system, at any one time there can be an Address that is associated with a READ or WRITE command from System Bus 12 that is the same Address for which a Microprocessor 30 may be attempting to process a SET DIRTY command to change the DIRTY bit in the DTAG RAMs. The present invention addresses this situation through the use of the comparators in both the Cache Queue 60 and the DTAG Controller 54 along with the DA Flag in the Microprocessor Interface 52.

In many cases, System Bus 12 is going to be idle and not providing command/address information into latch pipeline 62 and, in turn, into the Cache Queue 60. This is particularly true in a uni-processor system with one CPU Module, one I/O Module and several memory modules where there will be very little activity on the system bus. In accordance with the present invention, if Microprocessor 30 issues a SET DIRTY command and there are no valid entries in Cache Queue 60 and latch pipeline 62, the SET DIRTY command is acknowledged by default. This acknowledgement by default is described in more detail below.

When the system is powered up, there is nothing happening in the pipeline latches or Cache Queue and a bit in the Default Acknowledge Flag 92 is established in the "set" position. As a result of the combination of OR Gates 86, 88 and 90, as soon as VALID traffic (as indicated by VALID bits associated with system bus commands) fills the pipeline latches and Cache Queue locations, the series of OR Gates 86, 88 and 90 pulls the Default Acknowledge Flag 92 down from the set position. Once the command passing through the pipeline latches and Cache Queue is retired, and there are no other commands with their VALID bits asserted in the pipeline latches or Cache Queue, the Default Acknowledge Flag 92 will be reset to the set position.

If during system operation Microprocessor 30 issues a SET DIRTY command and the Default Acknowledge Flag 92 is not asserted (i.e., there is a VALID entry in the Cache Queue locations and pipeline latches), Decoder 70, having received the SET DIRTY command, sends a "start" signal to Cache Queue Address Comparator 78 over signal lines 61b and to Set Dirty Comparator 80 a SET DIRTY "start" signal over signal lines 63a. These start signals cause the respective comparators to begin comparisons of their addresses with the address associated with the SET DIRTY command. The Set Dirty Comparator sums its comparisons with the comparisons of the Cache Queue Address Comparator received over signal lines 76b. If the sum of the comparisons shows that there is no command from the system bus that would conflict with updating the DTAG RAMs as a result of the SET DIRTY command, address information is sent from Set Dirty Comparator 80 over signal lines 87 to Update Queue 89 to load Update Queue 89 with the address information needed for updating the status to DIRTY in the DTAG RAMs in accordance with the SET DIRTY command. At the same time, a signal 63c is sent from Set Dirty Comparator 80 to Microprocessor Interface Controller 64 to enable Microprocessor Interface Controller 64 to send an ACK over signal lines 50 to Microprocessor 30. The information in Update Queue 89 is then sent over signal lines 93 to Multiplexer 95, which multiplexes signals received from the system bus over signal lines 97 with signals received from update Queue 89. The output from Multiplexer 95 feeds signal line 56 coupled to DTAG RAMs 40.

If during system operation Microprocessor 30 issues a SET DIRTY command and the Default Acknowledge Flag 92 is asserted (i.e., there are no VALID entries in the Cache Queue locations and pipeline latches), Microprocessor Interface Controller 64 sends an ACK over signal lines 50 to Microprocessor 30. In addition, at the same time, Decoder 70, having received the SET DIRTY command, does not cause a "start" signal to be sent to Cache Queue Address Comparator 78 over signal lines 61b and the SET DIRTY "start" signal over signal lines 63a to Set Dirty Comparator 80, but rather sends a SET DIRTY DEFAULT ACKNOWLEDGE signal over signal line 63b to Set Dirty Comparator 80. This SET DIRTY DEFAULT ACKNOWLEDGE signal in effect causes the comparator comparisons to be bypassed rather than invoking the lengthy comparison process involving the system bus addresses and commands in the pipeline and the processor addresses and commands. By bypassing the comparator comparisons Update Queue 89 gets immediately updated and, in turn, DTAG RAMs 40 are updated in accordance with the SET DIRTY command. As such, this process provides coherency between the processor cache Tag status and its Duplicate Tag cache status and results in significant gain in the computer system's overall performance.

While a preferred embodiment has been described herein, variations will become apparent to those skilled in the art without departing from the principles and spirit of the invention, the scope of which is defined in the appended claims. For example, the SET DIRTY response operation can be applied to multiple CPUs sharing the same port to a DTAG. The DTAG RAMs can be of various types (e.g. Self-Timed RAMs) which, in turn, give rise to different variations of the DTAG controller pipeline latches. Various types/sizes of queues and caches can be used to implement the invention. The pipeline of valid bits may be extended to include valid bits associated with commands on the system bus or requests on the system bus.

We claim:

1. In a computer system having at least one processor module coupled to a system bus operating in accordance with a SNOOPING bus protocol, said system bus capable of transmitting system bus commands and addresses, and each of said processor modules including a processor which issues processor commands and addresses, an address interface coupled to said system bus, said address interface including interface pipeline means for receiving and storing said system bus commands and addresses in an ordered sequence, and a Duplicate Tag memory coupled to said address interface, said duplicate Tag memory including means for storing Duplicate Tag addresses and Duplicate Tag status information, a method of updating said Duplicate Tag status information, comprising the steps of:

provided by one of said processors to said address interface of said one of said processors, processor commands and addresses for modification of an entry of Duplicate Tag status information of said one of said processors;

receiving and storing by said interface pipeline means of said address interface of said one of said processors, system bus command and address information from said system bus;

determining if said system bus commands and addresses received and stored in said interface pipeline means are valid; and if said determining step establishes that there are no valid system bus commands and addresses in said interface pipeline means, causing an updating of said Duplicate Tag status information in accordance with said processor commands and addresses for modification without determining if said processor commands and addresses conflict with said system bus commands and addresses.

2. The method of updating said Duplicate Tag status information as set forth in claim 1, further comprising the step of:

if said determining step establishes that there are valid system bus commands and addresses in said interface pipeline means, further determining whether said processor commands and addresses for modification conflict with said system bus commands and addresses; and causing an updating of said Duplicate Tag status information in accordance with said processor commands and addresses for modification if said further determining determines that said processor commands and addresses for modification do not conflict with said system bus commands and addresses.

3. The method of updating said Duplicate Tag status information as set forth in claim 2, wherein the step of further determining includes comparing within said interface pipeline means said processor commands and addresses for modification with said system bus commands and addresses.

4. In a computer system having at least one processor module coupled to a system bus operating in accordance with a SNOOPING bus protocol, said system bus capable of transmitting system bus commands and addresses, and each of said processor modules including a processor which issues processor commands and addresses, an address interface coupled to said system bus, said address interface including interface pipeline means for receiving and storing said system bus commands and addresses in an ordered sequence, and a Duplicate Tag memory coupled to said address interface, said Duplicate Tag memory including means for storing Duplicate Tag addresses and Duplicate Tag status information, an apparatus for updating said Duplicate Tag status information, comprising:

means for providing by one of said processors to said address interface of said one of said processors, processor commands and addresses for modification of an entry of Duplicate Tag status information of said one of said processors;

means for determining if said system bus commands and addresses received and stored in said interface pipeline means are valid; and means for causing an updating of said Duplicate Tag status information in accordance with said processor commands and addresses for modification without determining if said processor commands and addresses conflict with said system bus commands and addresses, said means for causing an updating causing said updating in response to a determination by said means for determining that there are no valid system bus commands and addresses in said interface pipeline means.

5. The apparatus for updating said Duplicate Tag status information as set forth in claim 4, further comprising:

means for further determining whether said processor commands and addresses for modification conflict with said system bus commands and addresses, if said means for determining establishes that there are valid system bus commands and addresses in said interface pipeline means; and second means for causing an updating of said Duplicate Tag status information in accordance with said processor commands and addresses for modification, said second means for causing an updating causing said updating in response to a determination by said means for further determining that said processor commands and addresses for modification do not conflict with said system bus commands and addresses.

6. The apparatus for updating said Duplicate Tag status information as set forth in claim 5, wherein said interface pipeline means includes means for comparing said processor commands and addresses for modification with said system bus commands and addresses.

\* \* \* \* \*